(12) United States Patent
Xie et al.

(10) Patent No.: US 10,751,869 B2
(45) Date of Patent: Aug. 25, 2020

(54) SPEED-CHANGING TOOL

(71) Applicant: Positec Power Tools (Suzhou) Co., Ltd., Suzhou (CN)

(72) Inventors: Mingjian Xie, Suzhou (CN); Lianbao Wang, Suzhou (CN); Jingtao Xu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 32 days.

(21) Appl. No.: 15/560,648

(22) PCT Filed: Oct. 11, 2016

(86) PCT No.: PCT/CN2016/101787
§ 371 (c)(1),
(2) Date: Sep. 22, 2017

(87) PCT Pub. No.: WO2017/071466
PCT Pub. Date: May 4, 2017

(65) Prior Publication Data
US 2018/0250803 A1 Sep. 6, 2018

(30) Foreign Application Priority Data
Oct. 30, 2015 (CN) .......................... 2015 1 0727794

(51) Int. Cl.
*B25F 5/00* (2006.01)
*F16H 3/44* (2006.01)
(Continued)

(52) U.S. Cl.
CPC ............ *B25F 5/001* (2013.01); *B25B 21/008* (2013.01); *B25F 5/00* (2013.01); *F16H 3/44* (2013.01); *B25F 5/02* (2013.01)

(58) Field of Classification Search
CPC .......... B25B 17/00; B25B 17/02; B25F 5/001
(Continued)

(56) References Cited

U.S. PATENT DOCUMENTS 6,655,470 B1 12/2003 Chen
6,824,491 B2 11/2004 Chen
(Continued)

FOREIGN PATENT DOCUMENTS

CN 1354058 A 6/2002
CN 1583370 A 2/2005
(Continued)

OTHER PUBLICATIONS

International Search Report for International application No. PCT/CN2016/101787, dated Sep. 26, 2019.
(Continued)

*Primary Examiner* — Hemant Desai
*Assistant Examiner* — Christopher Robin Kim
(74) *Attorney, Agent, or Firm* — Marshall, Gerstein & Borun LLP

(57) ABSTRACT

The present invention discloses a speed changing tool, comprising: a housing; a motor, disposed in the housing and outputting rotary power; a trigger switch, used for starting and stopping the motor; an output shaft; a gear transmission, which is disposed between the motor and the output shaft to transmit rotation of the motor to the output shaft, and comprises at least one group of gear system, a gear ring meshed with the gear system and a moving member, wherein the moving member can be moved between a first position and a second position and when in the first position and the second position, the moving member has different states relative to the housing, such that the gear transmission outputs a rotary speed of the motor with different speed reduction ratios; the variable speed tool further comprises a
(Continued)

drive mechanism for driving the moving member to move between two positions, when a load of the output shaft reaches or exceeds a preset value, the drive mechanism can drive the moving member to move to the second position from the first position, the trigger switch can push the drive mechanism to drive the moving member to move to the first position from the second position when the trigger switch comes back from a work position to an original position.

9 Claims, 8 Drawing Sheets

(51) Int. Cl.
*B25B 21/00* (2006.01)
*B25F 5/02* (2006.01)

(58) Field of Classification Search
USPC .......... 173/216, 217, 47; 475/266, 299, 320
See application file for complete search history.

(56) References Cited

U.S. PATENT DOCUMENTS

| | | | |
|---|---|---|---|
| 2009/0277658 A1* | 11/2009 | Chen | B23B 45/008 173/183 |
| 2014/0008093 A1* | 1/2014 | Patel | H02J 7/00 173/217 |
| 2014/0274548 A1* | 9/2014 | Kelleher | B25F 5/001 475/293 |
| 2014/0296020 A1* | 10/2014 | Chen | B25B 23/147 475/269 |

FOREIGN PATENT DOCUMENTS

| | | |
|---|---|---|
| CN | 2934776 Y | 8/2007 |
| CN | 101115585 A | 1/2008 |
| CN | 201664773 U | 12/2010 |
| CN | 102485436 A | 6/2012 |
| WO | WO-2014195279 A1 | 12/2014 |

OTHER PUBLICATIONS

International Search Report for International application No. PCT/CN2016/101787, dated Dec. 30, 2016.

* cited by examiner

SPEED-CHANGING TOOL

BACKGROUND

Technical Field

The present invention relates to a speed changing tool, in particular to a tool driven by an electromotor, a pneumatic motor or a hydraulic motor, having a multiple-speed transmission mechanism and capable of outputting different rotary speeds, such as an electric drill, a screwdriver, a hammer drill and the like.

Related Art

The speed changing tool, such as an electric drill, a screwdriver and a hammer drill has a multiple-speed transmission mechanism and can output different rotary speeds according to the change of a load torque. The multiple-speed transmission mechanism of the speed changing tool generally comprises a multistage transmission gear mechanism connected to an electric motor and an output shaft, and a speed adjusting device, and the speed adjusting device axially moves to change a meshing relation with the multistage transmission gear mechanism so as to change a transmission ratio to output different speeds. In prior art, adjustment of the speed adjusting device is usually finished by manual operation, for example, U.S. Pat. No. 6,655,470 discloses a manual speed adjusting device, and a speed adjusting ring of the speed adjusting device is connected to a speed adjusting button, which is capable of axially moving and disposed on an enclosure, by a connector; an operator pushes the speed adjusting button to axially move to further drive the speed adjusting ring to axially move, such that the speed adjusting ring selectively locks a first inner gear ring or a second inner gear ring in the multistage transmission gear mechanism with the enclosure or the speed adjusting ring is meshed with the first and second inner gear rings simultaneously to enable the same to synchronously rotate, therefore the output of three kinds of different rotary speeds and torques is realized. But, because of such manual operation, the operator has to pay attention to a working state and a load change condition of the tool in real time and judges when to adjust the speed adjusting device. Such manual operation requires high operation skill of the operator and is unfavorable for improvement of efficiency.

In recent years, some automatic speed changing tools have emerged, for example, the automatic speed changing mechanism disclosed in U.S. Pat. No. 6,824,491, a control system thereof can automatically adjust a meshing relation with the gear transmission according to the change of a load torque to realize output of different speeds, such control system uses a thrust ring with a cam surface to push a slide ring to axially move, and further, an inner gear ring in the gear transmission is driven to axially move to be clamped with a rotation stopping device disposed on a shell. These automatic speed changing mechanisms enable a mechanical structure in the gear transmission to be relatively complex, besides, because the inner gear ring bears an elastic force action from an opposite direction while axially moving, it is very easily caused that the inner gear ring cannot move to a right position, gear shifting is failed, and as a result, the purposes of automatic gear shifting and industrialized implementation cannot be really realized.

BRIEF DESCRIPTION OF THE DRAWINGS

The present invention is further explained in combination with drawings and by taking a screwdriver as preferred embodiments.

DETAILED DESCRIPTION

Preferred embodiments of the present invention are specifically explained by take a screwdriver as an example.

Figure 1:
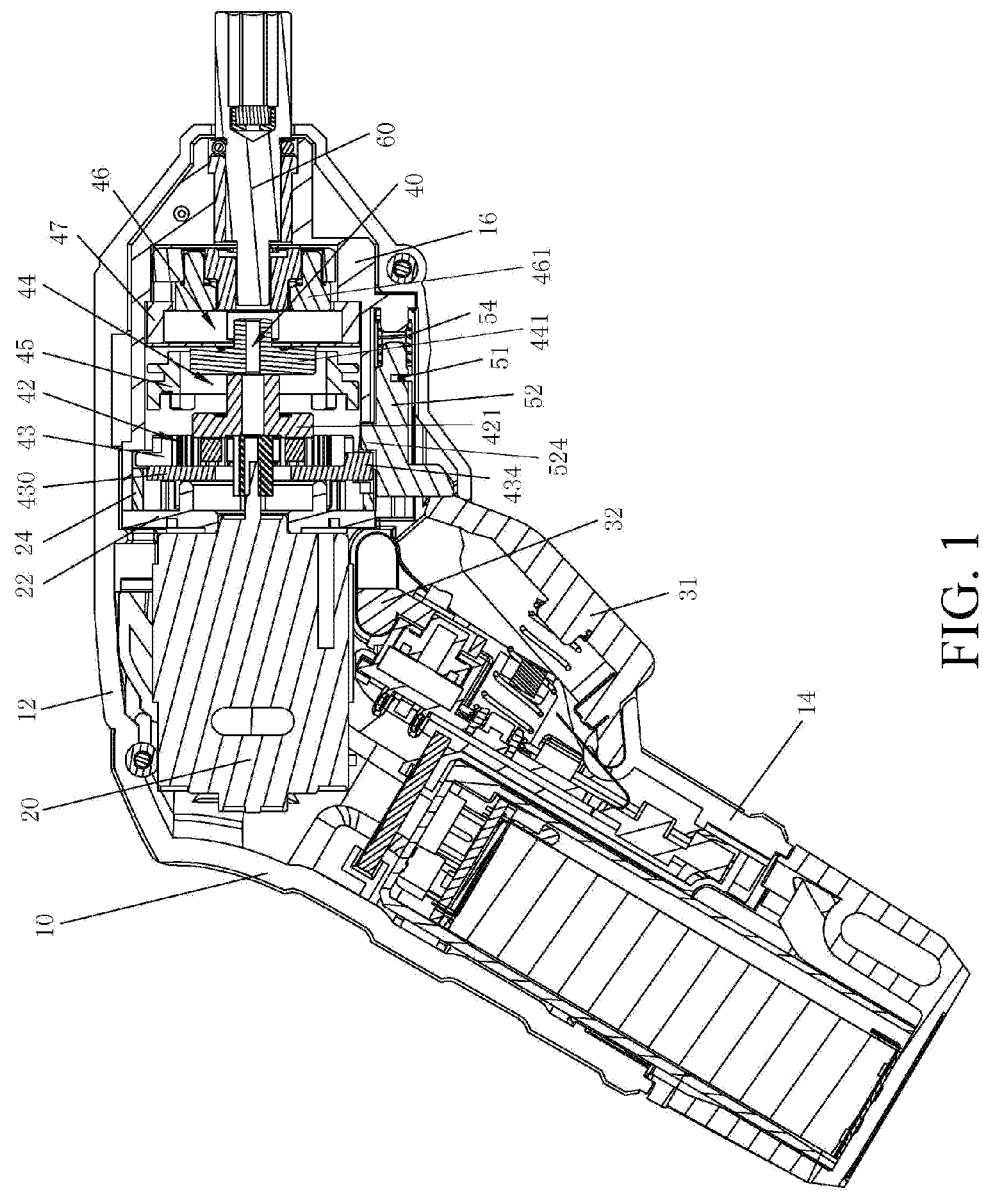
FIG. 1 is a section view of a screwdriver of a first preferred embodiment of the present invention, wherein a speed adjusting ring is located in a first position.
Figure 2:
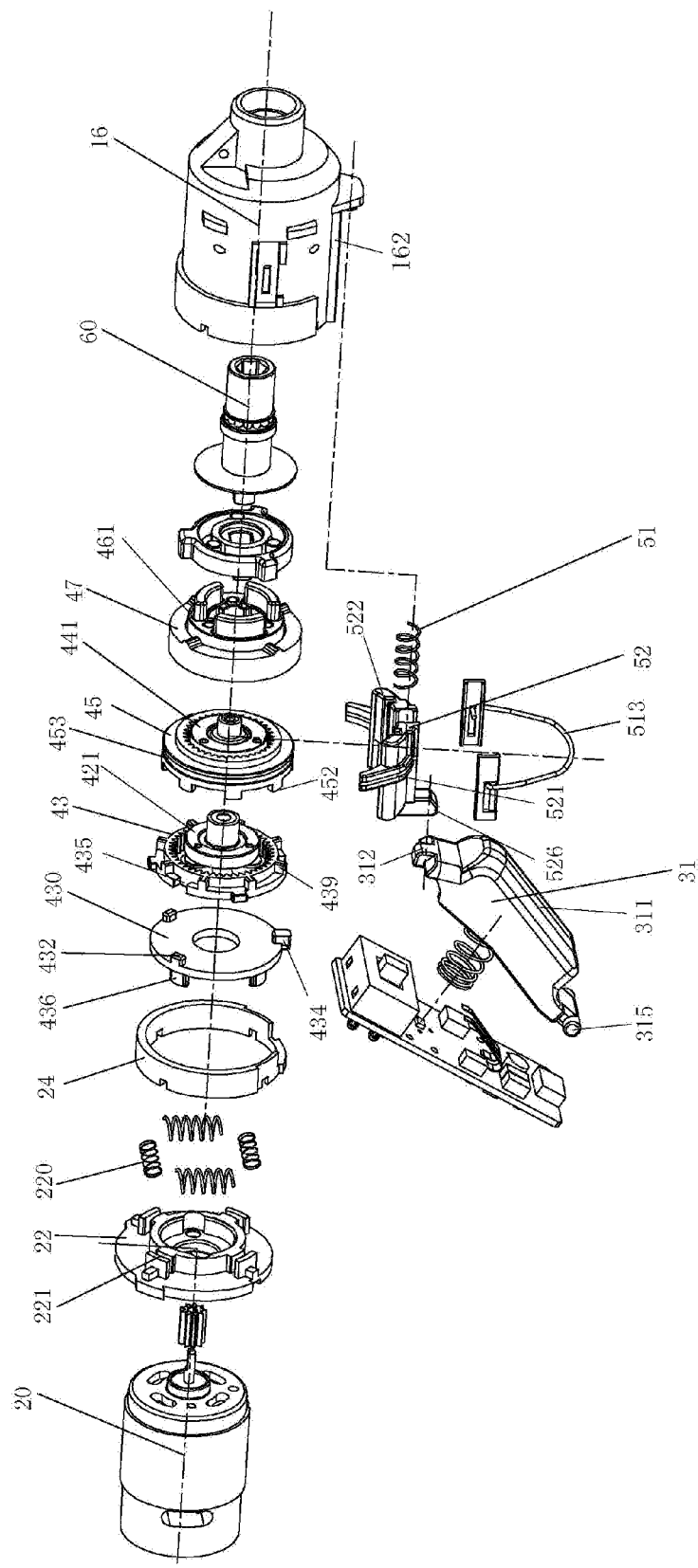
FIG. 2 is a stereoscopic exploded view of a transmission mechanism part of the screwdriver of the first preferred embodiment of the present invention.

Referring to FIG. 1 to FIG. 2, a screwdriver comprises a housing 10, the housing 10 is formed by connecting two half-type housing part, a motor 20 is diposed in the housing 10, the motor 20 of the present embodiment adopts an electric motor, and can also be replaced with other types of motors, such as a pneumatic motor, a fuel motor, etc., wherein the housing 10 comprises a motor housing 12 containing the motor 20 and a handle 14 connected to the motor housing 12, and the motor housing 12 extends along a horizontal direction and is disposed by forming an angle with an extending direction of the handle 14. In the present embodiment, an angle between the motor housing 12 and the handle 14 is approximately between 90 degrees and 130 degrees. One end of the handle 14 away from the motor 20 is provided with an energy unit providing energy for the motor 20, the energy unit in the present embodiment adopts a battery that is disposed in a battery pack, the battery pack is detachably connected to the handle 14, and the battery can also be disposed to be fixed on the back end of the handle. The battery preferably adopts a lithium battery. The part of the handle 14 connected to the motor housing 12 is provided with a switch trigger 31 used for manually controlling the motor 20 and a reversing shifting button 32, a switch is disposed in the housing 10, the switch is triggered by the switch trigger 31 so as to control the motor 20 to be started and stopped, a power supply panel can also be used, and circuit connection between the switch trigger 31 and the power supply panel can also realize control over the starting and closing of the motor 20.

An output shaft 60 driven by the motor 20 to rotate is disposed in the motor housing 12, the output shaft 60 extends along a horizontal direction of the motor housing 12, and in the present embodiment, the axis of the output shaft 60 and the rotary axis of the motor are coaxial; in other optional solutions, the axis of the output shaft 60 and the rotary axis of the motor can be parallel or at an angle. A gear transmission 40 for speed reduction is disposed between the output shaft 60 and the motor 20, and at least part of the gear transmission is disposed in a gearbox shell 16. In the present embodiment, the gear transmission 40 for speed reduction preferably adopts a planetary gear transmission. The motor 20 is fixed on a connecting plate 22 by screws, a plurality of protrusions are disposed on the connecting plate 22 in the peripheral direction and are used to be clamped in corresponding grooves in the housing, such that the connecting plate 22 is fixed relative to the housing 10, the connecting plate 22 is axially abutted against the gearbox shell 16, and not only can the gearbox shell 16 be closed, but also an axial direction of the connecting plate 22 is limited.

The gear transmission 40 comprises a first planetary gear system 42 comprising first planetary gears and a first planetary carrier 421, a second planetary gear system 44 comprising second planetary gears and a second planetary carrier 441, a third planetary gear system 46 comprising third planetary gears and a third planetary carrier 461, a first inner gear ring 43 meshed with the first planetary gear set 42, a moving member 45 capable of axially moving and a third inner gear ring 47 meshed with the third planetary gear set 46. Each planetary gear system comprises a plurality of planetary gears, which are disposed on a support of the corresponding planetary carrier. Outer teeth are distributed on the outer circumference of the first planetary carrier 421; a first sun gear convexly extends from the front end of the first planetary carrier 421, extends to be located in the center of the second planetary gear system 44 and is meshed with the respective second planetary gears; and so on, a rotary speed output by the motor 20 is output by the first sun gear through a first stage speed reduction system, and similarly, the first sun gear as rotary output is finally output by the output shaft 60 through a second stage speed reduction system and a third stage speed reduction system. In the present embodiment, the speed reduction mechanism obtains a desired output rotary speed through the three stages of speed reduction systems, and in other embodiments, regarding the rotary speed needing to be output, the speed reduction mechanism can only comprise two stages of speed reduction systems, and can also comprise more stages of speed reduction systems.

The drive mechanism is disposed on the gearbox shell 16 and comprises a drive part 52 and a transmission part, the drive part 52 of the present embodiment is provided with an arc groove 521, and the transmission part is of a steel wire cover 513 matched and connected with the arc groove 521. The moving member 45 is a speed adjusting ring having inner teeth and end teeth 452, in the present embodiment, it can also be considered that the moving member 45 is a second inner gear ring, on which an annular groove 453 containing the steel wire cover 513 is disposed, the steel wire cover 513 is semicircular, and two end parts thereof extend into the gearbox shell 16 from grooves of the gearbox shell 16 and are clamped in the annular groove 453. The speed adjusting ring 45 can be driven by the drive part 52 to axially move through the steel wire cover 513, so as to be matched with the planetary gear system in different manners to realize speed change.

The gearbox shell 16 is approximately cylindrical, the drive part 52 is configured to be an arc sliding block capable of attaching to the outer surface of the gearbox shell 16, the outer surface of the gearbox shell 16 is provided with an axial guide rail 162, one surface of the drive part 52 facing the gearbox shell 16 is provided with an axial guide groove 522, and the drive part 52 axially moves along the gearbox shell 16 through guiding of the guide rail and the guide groove.

The first inner gear ring 43 comprises an annular main body and a drive plate 430 fixedly connected to the annular main body, a plurality of grooves 435 are distributed in the end surface of the first inner gear ring 43, and can be matched with the protrusions 432 formed on the end surface of the drive plate 430 to ensure relative fixation of the two, a clamping block convexly extends along the radial direction of the outer peripheral surface of the first inner gear ring 43, an arc groove (not shown) is disposed in the gearbox shell 16, the clamping block is clamped in the arc groove to enable the first inner gear ring 43 to be axially fixed relative to the gearbox shell 16 and to be capable of rotating in certain range relative to the gearbox shell 16, and an rotary angle can be realized by setting a radian of the arc groove. One end of the outer peripheral surface of the first inner gear ring 43 back to the motor is provided with a plurality of end teeth 439, and the plurality of end teeth 439 are used to be meshed with the end teeth 452 of the moving member 45 to ensure relative fixation of the two so as to lock rotation of the moving member 45. Of course, the first inner gear ring 43 and the drive plate 430 can also be disposed integrally, and the reason why the two elements are disposed is only to facilitate manufacturing and mounting.

The bottom of the drive plate 430 is provided with a limiting member 434 radially protruded out of the first inner gear ring 43, the drive part 52 is provided with a stop member 524 axially abutting against the limiting member 434, one side of the drive part 52 adjacent to the output shaft 60 is provided with an first elastic element 51, which is preferably a pressure spring 54, one end of the pressure spring 54 abuts against the gearbox shell 16, the other end abuts against the drive part 52 and is used for providing a bias pressure for the drive part 52 to be in a direction from the output shaft 60 to the motor 20, and when the limiting member 434 is abutted against the stop member 524, the pressure spring 54 is in a compressed state. When the first inner gear ring 43 and the drive plate 430 rotate together to enable the limiting member 434 to be axially separated from the stop member 524, an elastic force of the pressure spring 54 is released, such that the drive part 52 drives the speed adjusting ring to move to the motor 20 by the steel wire cover 513. Of course, the limiting member 434 can also be disposed on the first inner gear ring 43, and similarly can also be driven to rotate. A lug 526 extends from one end of the drive part 52 close to the motor 20 to the handle 14, the switch trigger 31 is provided with a pressing part 312 abutted against the lug 526, and when the switch trigger 31 is pressed down or in a work position, the pressing part 312 on the switch trigger is separated from the lug 526 of the drive part 52; when the switch trigger 31 is released to be reset, the switch trigger 31 is pushed by spring to move and the drive part 52 is enabled to overcome an action force of the pressure spring 54 to be reset.

One surface of the drive plate 430 facing the motor is provided with a driving pins 436, the driving pins 436 is contained in the clamping groove 221 disposed in the end surface of the connecting plate 22, the driving pins 436 can rotate around a rotary axis of the motor 20 in the clamping groove 221, and in this way, the first inner gear ring 43 can rotate relative to the connecting plate 22 together with the drive plate 430. In the present embodiment, four shifting legs are disposed and are uniformly distributed along the peripheral direction of the drive plate 430, and correspondingly, four clamping grooves 221 are also disposed and are uniformly distributed along the peripheral direction of the connecting plate 22. A second elastic element 220 is disposed between every two clamping grooves 221, thus four second elastic elements 220 are also disposed, and preferably, the second elastic elements are pressure springs or tension springs and are uniformly distributed along a circumferential direction, so as to balance an elastic force. Hence, no matter the first inner gear ring 43 rotates forwards or backwards, the drive plate 430 can rotate therewith to drive the driving pins 436 to push against the second elastic elements 220, such that the second elastic elements 220 accumulate energy. A ring sleeve 24 is disposed between the drive plate 430 and the connecting plate 22 and is used to cover an axial space between the drive plate 430 and the connecting plate, such that the elastic elements are all located in a snap ring, and the elastic elements are prevented from shifting.

An automatic speed switching process of the speed changing tool is explained in detail in combination with drawings.

Figure 3:
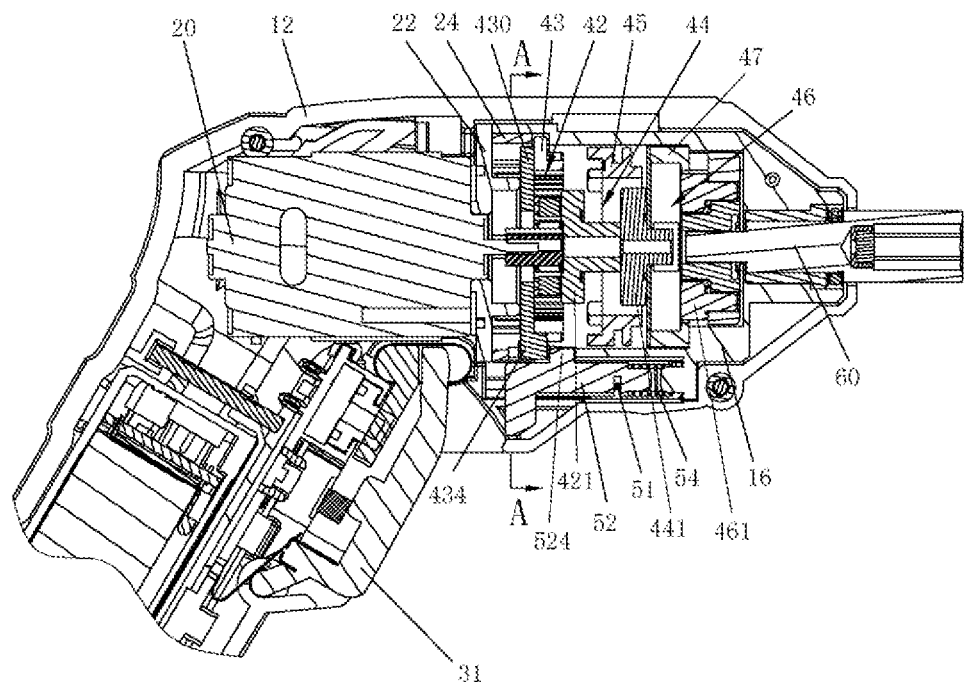
FIG. 3 is similar to FIG. 1, wherein the screwdriver is in a starting state.
Figure 4:
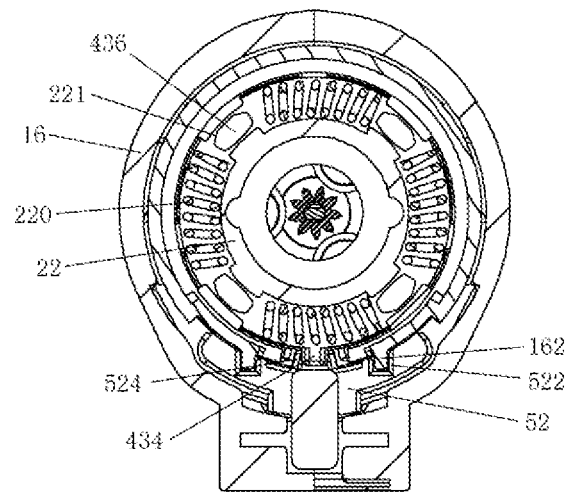
FIG. 4 is a section view along an A-A direction in FIG. 3.
Figure 5:
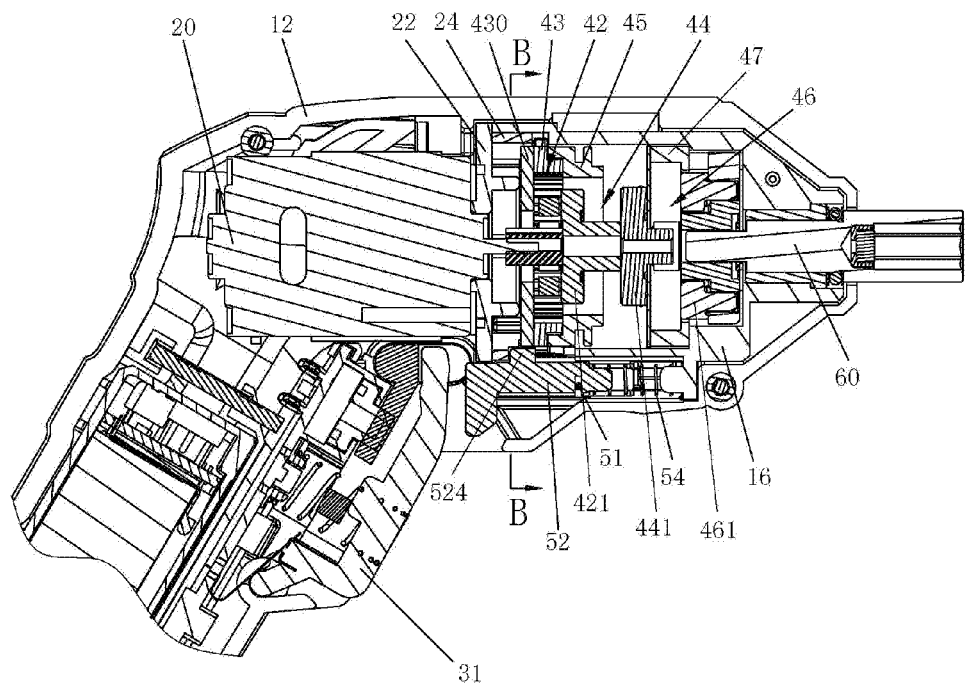
FIG. 5 is a section view that a speed adjusting ring of the screwdriver is in a second position of the first preferred embodiment of the present invention.
Figure 6:
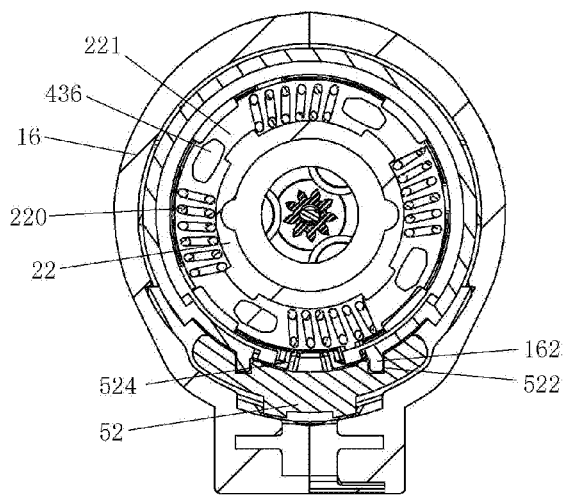
FIG. 6 is a section view along a B-B direction in FIG. 5.

Referring to FIG. 3, before the speed changing tool is started, the first inner gear ring 43 is in an initial position. During use, the switch trigger 31 is pressed down to start the motor 20 to enable the screwdriver to start working, the switch trigger 31 moves backwards when being pressed down (a direction from the motor to the output shaft is from back to front) to drive the pushing part 312 to release abutting-connection with the lug 526 of the drive part 52, the screwdriver is in a first working state, at this point, the moving member 45 is in a first position, the moving member 45 or the second inner gear ring 45 is meshed with the second planetary gears and the outer teeth of the second planetary carrier 441, and the limiting member 434 on the drive plate 430 limits the movement of the drive part 52 so as to keep the moving member 45 in the first position. When a load torque is increased while output power of the motor 20 is not changed, the first planetary gear system 42 cannot drive the first inner gear ring 43 to rotate, when a change of the load torque does not reach a preset value, the stop member 524 on the drive part 52 is stopped by the limiting member 434 on the drive plate 430 and cannot axially move, such that the screwdriver stably works in a first working state, and high speed is output. When the change of the load torque reaches or exceeds the preset value, the first inner gear ring 43 overcomes the action of an elastic force of the second elastic element 220 to rotate to a releasing position, such that the limiting member 434 on the drive plate 430 is separated from the stop member 524 on the drive part 52, the drive part 52 moves forward along the axial direction of the axial guide groove 522 under the action of the pressure spring 54, which is as shown in FIG. 6, the moving member 45 is in the second position, the moving member that is the second inner gear ring 45 is separated meshing from the outer teeth of the second planetary carrier 441 and is meshed with the second planetary gear, meanwhile the end teeth 452 of the moving member are meshed with the end teeth 439 of the first inner gear ring 43, the stop member 524 on the drive part 52 is abutted against the peripheral direction of the limiting member 434 on the drive plate 430, and the first inner gear ring 43 is stopped from being reset to the initial position, so that the drive part 52 can be correctly reset during shutdown, and the screwdriver stably works in a second working state and outputs low speed. When the switch trigger 31 is released to enable the screwdriver to stop working, the pushing part 312 of the switch trigger 31 pushes the lug 526 of the drive part 52 to compress the pressure spring 54, with movement of the stop member 524 driven by the drive part 52, the first inner gear ring 43 rotates to an opposite direction under the action of the second elastic element 220 to be reset to the initial position, the limiting member 434 on the drive plate 430 is returned to the position where the limiting member is axially abutted against the stop member 524, and the drive part 52 drives the moving member 45 to return to the first position. During reuse, the switch trigger 3126 is pressed to repeat the process mentioned above.

Figure 7:
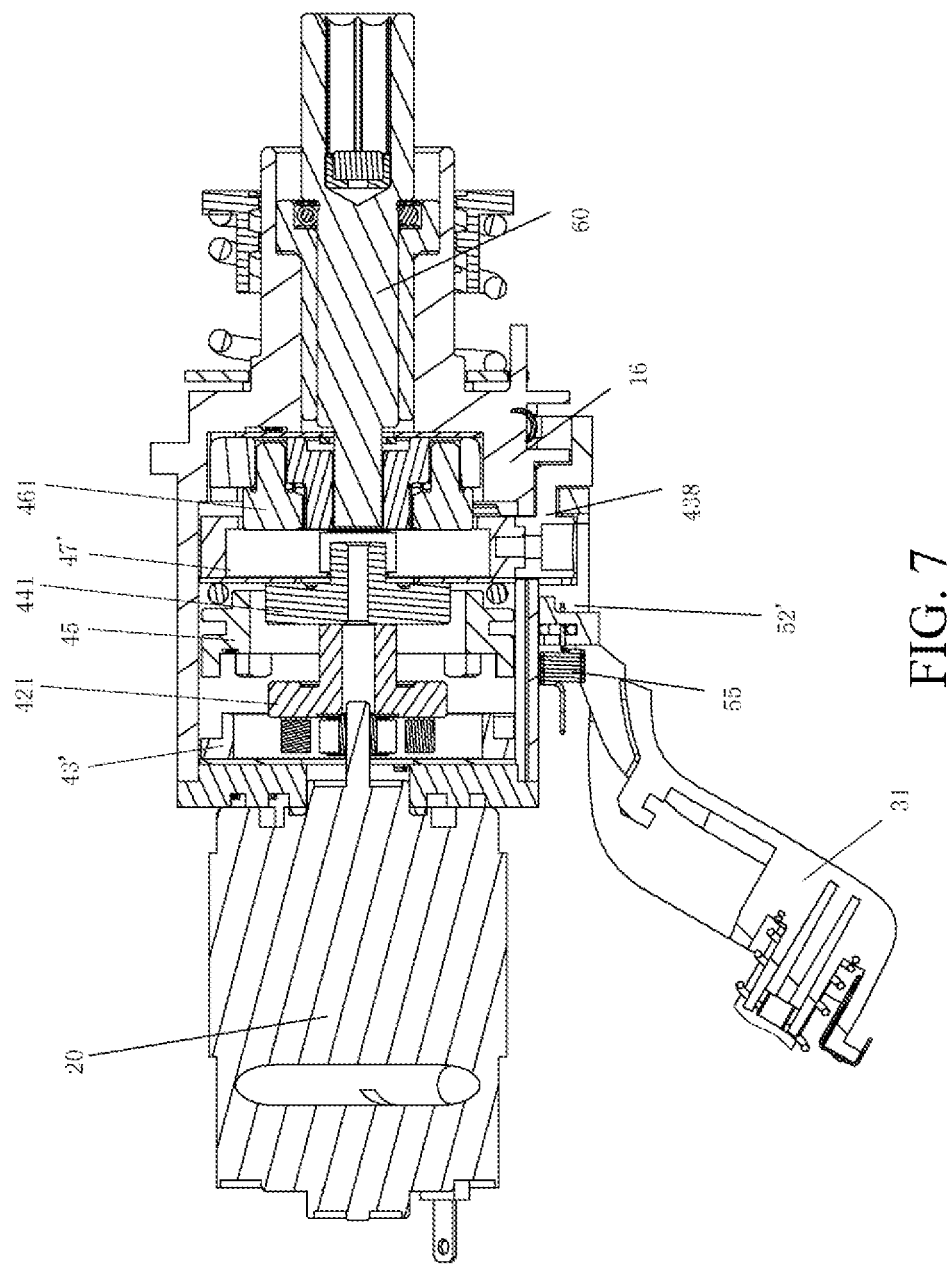
FIG. 7 is a local schematic diagram of a transmission part of a screwdriver of a second preferred embodiment of the present invention, wherein a speed adjusting ring is in a first position.
Figure 8:
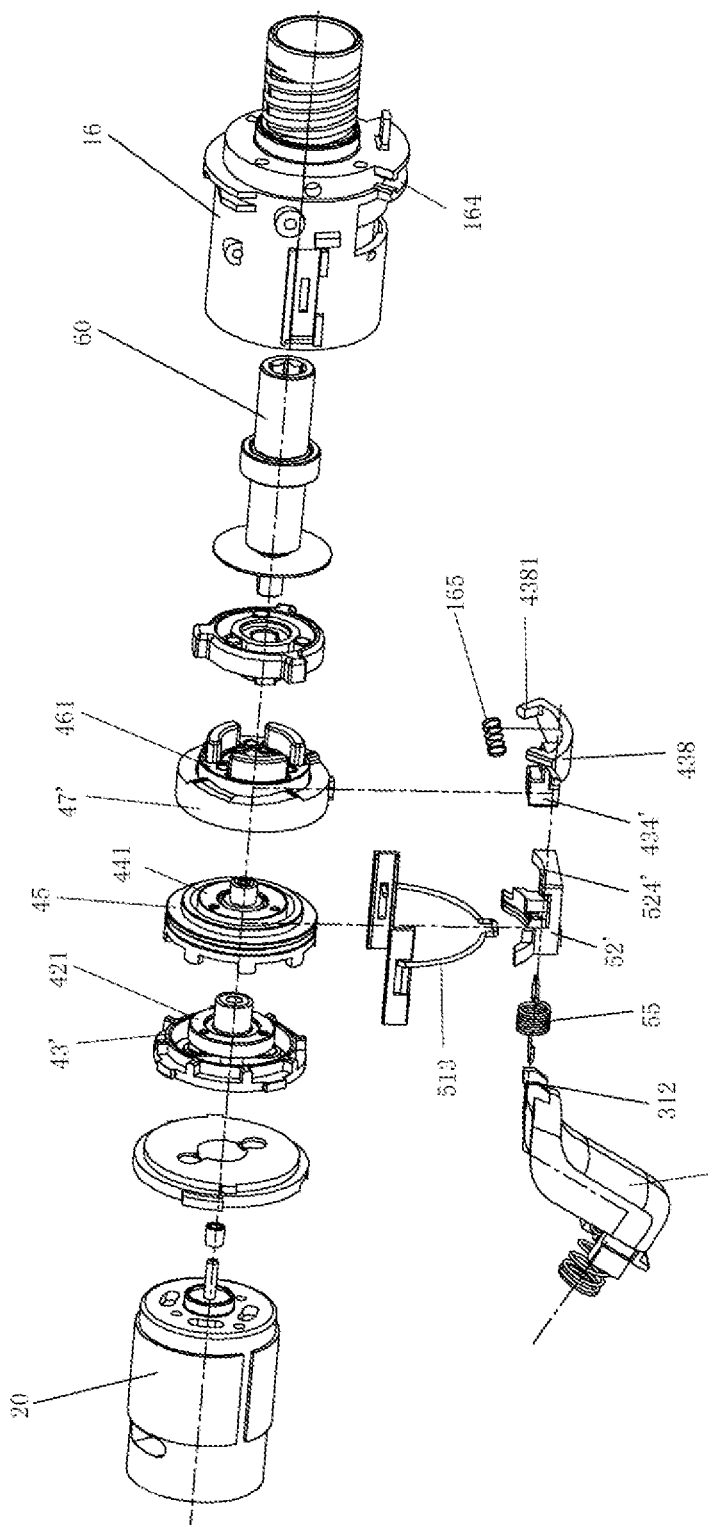
FIG. 8 is a stereoscopic exploded view of a transmission part in FIG. 7.

Referring to FIG. 7 and FIG. 8, the second preferred embodiment of the present invention differs from the first preferred embodiment in that a third inner gear ring 47 can rotate when the load reaches or exceeds the preset value. Specifically, the third inner gear ring 47' is fixedly disposed in the gearbox shell 16 and meshed with the third planetary gears, the back end of the third planetary carrier 461 is provided with a support for connecting the third planetary wheel, and the front end of the third planetary carrier 461 is connected to the output shaft 60. A disposing manner and moving form of the moving member 45 are same as those of the first embodiment, the third inner gear ring 47' comprises an annular main body and a rotary block 438 fixedly connected to the annular main body, the third inner gear ring 47' is meshed with the third planetary gears, the rotary block 438 is disposed outside the gearbox shell 16, two peripheral ends thereof are provided with clamping bulges 4381 and are clamped in an annular chute 164 in the gearbox shell 16, the second elastic element 165 is disposed in the annular chute 164 and is a pressure spring preferably, both ends of the pressure spring are respectively abutted against the clamping bulges 4381 on the two ends, the middle of the pressure spring is fixed on the gearbox shell 16, in this way, no matter the rotary block 438 rotates along with the third inner gear ring 47' clockwise or counterclockwise, the pressure spring can provide an elastic force for the rotary block 438 to return to the initial position.

One side of the axial direction of the rotary block 438 opposite to the clamping bulges 4381 is provided with a limiting member 434', a drive part 52' is provided with a stop member 524' axially clamped with the limiting member 434', one side of the drive part 52' close to the motor 20 is provided with a tension spring 55, one end of the tension spring 55 is hooked on the switch trigger 31, and the other end is hooked on the drive part 52' and is used for providing an elastic force for the drive part 52' to move to a direction from the output shaft 60 to the motor 20. The switch trigger 31 is pressed down to start the speed changing tool, the tension spring 55 is in a stretching energy accumulation state, the load reaches or exceeds a preset value, and the third inner gear ring 47' drives the rotary block 438 to rotate together, such that the limiting member 434' is separated from the stop member 524'; the elastic force of the tension spring 55 is released, such that the drive part 52' drives the moving member 45 to move to the motor 20 by the steel wire cover 513. The pressing part 312 on the switch trigger 31 is separated from the drive part 52' when the switch trigger 31 is pressed; when the switch trigger 31 is released to be reset, the spring of the switch trigger 31 will push the switch trigger 31 to move, and the drive part 52' is pushed to be reset by the pressing part 312. Of course, the tension spring 55 can be disposed in a manner that one end is hooked on the drive part 52' and the other end is hooked on the housing 10, the tension spring 55 is preset to be the energy accumulation state, and thus the drive part 52' can be driven to move.

Figure 9:
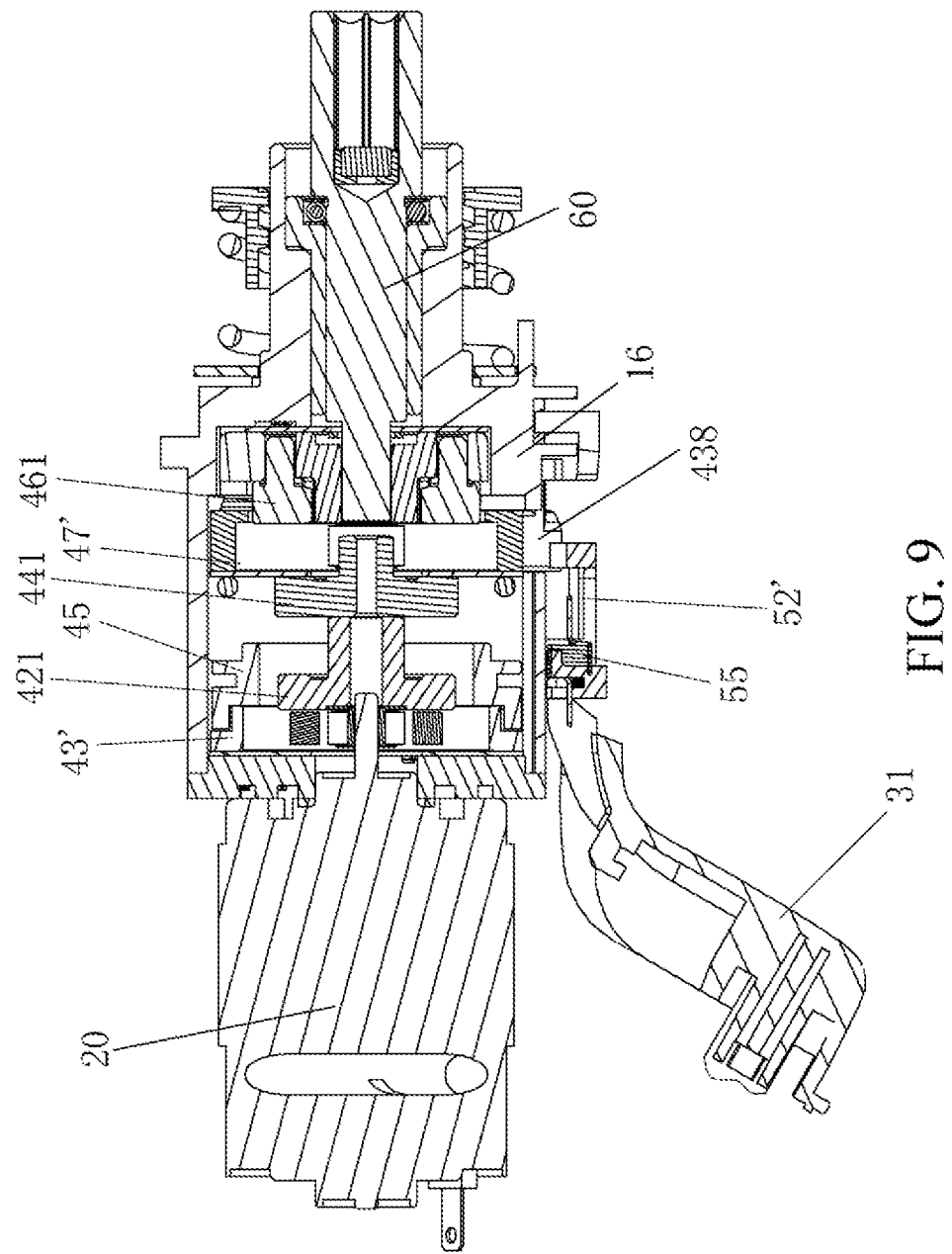
FIG. 9 is a section view that a speed adjusting ring of the screwdriver is in a second position of the second preferred embodiment of the present invention.
Figure 10:
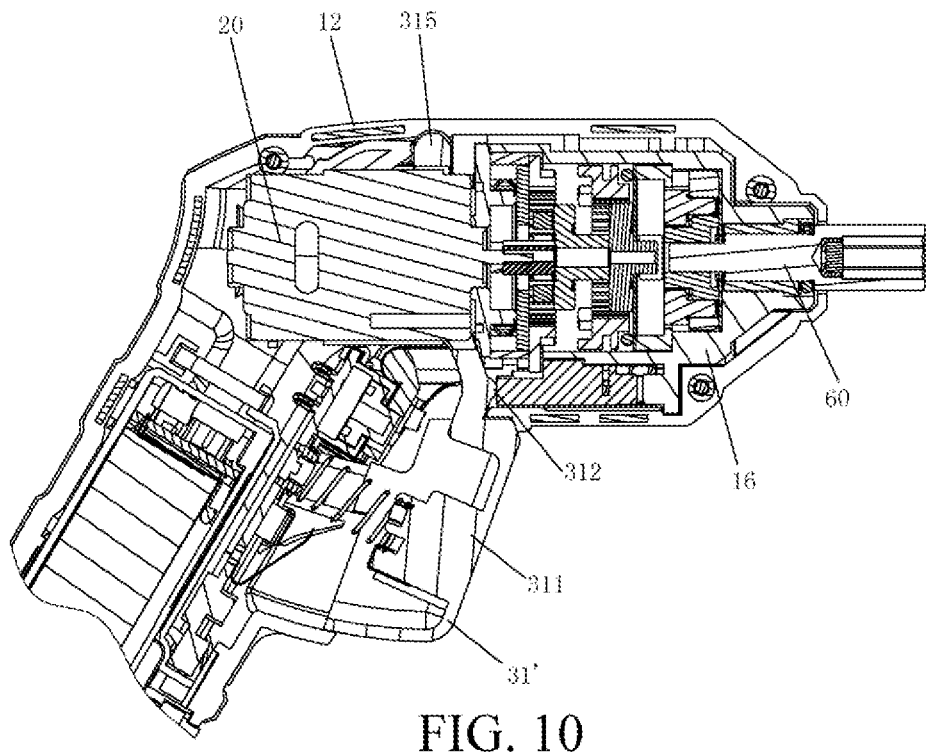
FIG. 10 is a section view of a screwdriver of a third preferred embodiment of the present invention.
Figure 11:
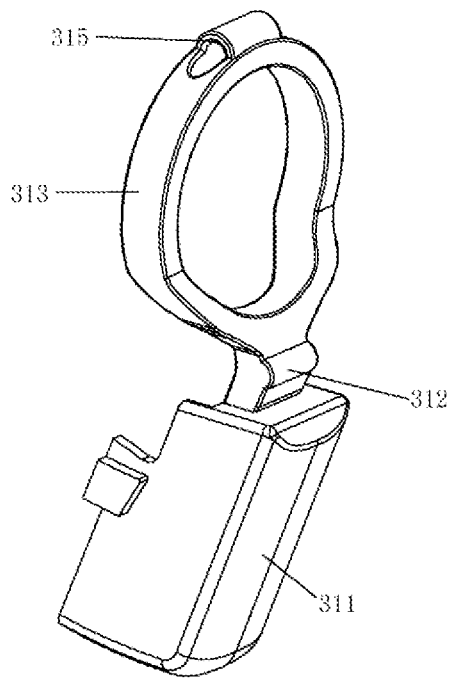
FIG. 11 is a three-dimensional view of a switch trigger in the third preferred embodiment of the present invention.

Referring to FIG. 9 and FIG. 10, a third preferred embodiment of the present invention differs from the first or second preferred embodiment in that a joint portion 315' of the switch trigger 31' is disposed on the upper part of the housing 10. Specifically, the switch trigger 31' comprises an operating part 311' for an operator to press, a joint portion 315' connected on the housing 10 in a pivoting manner and a connecting portion 313 connected to the operating part 311' and the joint portion 315', the connecting portion 313 is approximately circular, the connecting portion 313 surrounds the outer side of the motor 20, by this disposing manner, an operating force for pressing the trigger switch 31' can be reduced, that is, an arm of force from a pivoting point to an operating point is increased, such that the switch trigger is more laborsaving in pressing operation.

In view of the foregoing, no matter the switch trigger is set in which manner, it can be reset to a original position from a work position, that is, in operation, the motor is started by pressing the switch trigger, the motor is stopped by releasing the switch trigger, movement of the switch trigger drives a drive mechanism to be reset, that is, the drive part 52 drives the moving member 45 to reset to the first position. Of course, the structure that the switch trigger is shutdown to reset the drive mechanism not only can be used for automatic speed change in the mechanical manner mentioned above but also can be applied to automatic speed change of an electronic control manner, that is, after starting up, by detecting some parameters of the tool, when the detected parameters reach or exceeds the preset values, a drive device such as an electromagnet or small motor is controlled to drive the gear ring to move to realize speed change, and when the trigger is released, the gear ring is driven to be reset by movement of the trigger. The electronic control manner can be the manner adopted by a speed changing tool disclosed in U.S. Pat. No. 7,882,899B2, and can also be other control manners with a similar principle and other control manners that those skilled in the art have been familiar with, which are not repeated here.

The present invention is not limited to the structures of listed specific embodiments, those skilled in the can make other changes under revelation of a technical essence of the present invention, and as long as those changes can realize the functions same as or similar to the present invention, they fall within a protective scope of the present invention.

The invention claimed is:

1. A speed changing tool, comprising:
   a housing;
   a motor being disposed in the housing for outputting a rotary force;
   a trigger switch being movable between a work position to start the motor and an original position to stop the motor;
   an output shaft;
   a gear transmission being disposed between the motor and the output shaft, the gear transmission configured to transmit the rotary force of the motor to the output shaft, and the gear transmission comprising at least one group of a gear system;
   a gear ring meshed with the gear system; and
   a moving member being movable relative to the housing between a first position and a second position, wherein the gear transmission outputs a motor speed with a first reduction ratio corresponding to the first position of the moving member and a motor speed with a second reduction ratio corresponding to the second position of the moving member, wherein the first reduction ratio is different from the second reduction ratio;
   wherein the speed changing tool further comprises a drive mechanism being configured to drive the moving member to move between the first position and the second position such that when a load of the output shaft reaches or exceeds a preset value, the drive mechanism drives the moving member to move from the first position to the second position, and the drive mechanism is driven by the trigger switch to move the moving member from the second position to the first position when the trigger switch moves from the work position to the original position;
   the speed changing tool further comprising a limiting member fixedly disposed relative to the gear ring such that when the moving member is in the first position, the limiting member matches with the drive mechanism to prevent the drive mechanism from moving, and when the load of the output shaft reaches or exceeds the preset value, the gear ring rotates to drive the limiting member to separate from the drive mechanism, so that the drive mechanism is allowed to drive the moving member;
   wherein a third elastic element drives the trigger switch to be converted from the work position to the original position;
   wherein the housing comprises a horizontal portion for containing the gear transmission and a handle portion angular with the horizontal portion, and the trigger switch comprises a joint portion pivotally disposed on the horizontal portion; and
   wherein the trigger switch comprises an operating portion for switching on and off the motor and a connecting portion connected the joint portion with the operating part, the connecting portion at least partially encircling the motor.

2. The speed changing tool according to claim 1, wherein the drive mechanism comprises a drive part connected to the moving member and a first elastic element biasing against the drive part along a direction from the first position to the second position, when the moving member is in the first position and the trigger switch is in the work position, the drive part bears a drive force from the first elastic element.

3. The speed changing tool according to claim 1, wherein the limiting member extends along a radial direction of the gear ring, the drive mechanism comprises a stop member capable of abutting against the limiting member to prevent the drive mechanism from moving and separating from the limiting member to permit the limiting member to move.

4. The speed changing tool according to claim 3, wherein the gear ring has an initial position corresponding to the limiting member being axially abutted against the stop member and a releasing position corresponding to the limiting member being axially separated from the stop member and in which the drive mechanism drive the moving member from the first position to the second position; when the moving member is in the second position and the drive mechanism is located at a position in which the drive mechanism circumferentially abutted against the limiting member, the gear ring is prevented moving from the releasing position to the initial position.

5. The speed changing tool according to claim 1, wherein it further comprises a second elastic element for urging the gear ring to be able to rotate to an initial position.

6. The speed changing tool according to claim 5, wherein the at least one group of gear system is adjacent to the motor.

7. The speed changing tool according to claim 6, wherein a connecting plate is fixedly disposed relative to the housing and is disposed between the motor and the gear ring, the gear ring is fixedly disposed on a drive plate, the second elastic element biases against the connecting plate and the drive plate.

8. The speed changing tool according to claim 7, wherein a drive pin is disposed on one of the connecting plate and the drive plate, a clamping groove is disposed on the other one of the connecting plate and the drive plate, the drive pin is engageable with the clamping groove and movable along the clamping groove.

9. The speed changing tool according to claim 5, wherein the at least one group of gear system is adjacent to the output shaft.

* * * * *